United States Patent
Magee

(10) Patent No.: US 9,869,480 B2
(45) Date of Patent: Jan. 16, 2018

(54) MANAGING AIR FLOW

(71) Applicant: Bryn Gough Magee, Peterborough (CA)

(72) Inventor: Bryn Gough Magee, Peterborough (CA)

(*) Notice: Subject to any disclaimer, the term of this patent is extended or adjusted under 35 U.S.C. 154(b) by 55 days.

(21) Appl. No.: 14/303,985

(22) Filed: Jun. 13, 2014

(65) Prior Publication Data

US 2014/0326797 A1    Nov. 6, 2014

Related U.S. Application Data

(63) Continuation of application No. 12/695,061, filed on Jan. 27, 2010, now Pat. No. 8,776,457.

(60) Provisional application No. 61/148,014, filed on Jan. 28, 2009.

(51) Int. Cl.
*E04H 6/42* (2006.01)
*F24F 9/00* (2006.01)
*B65G 69/00* (2006.01)

(52) U.S. Cl.
CPC .............. *F24F 9/00* (2013.01); *B65G 69/006* (2013.01); *B65G 69/008* (2013.01); *B65G 2207/22* (2013.01)

(58) Field of Classification Search
CPC ........... B65G 69/006; E04H 6/08; E04H 6/10; E04H 6/426; E04B 1/348; E04F 1/003; F24F 9/00; F24F 2009/002; F24F 2009/005; F24F 2009/007
USPC ........ 52/173.2, 174–176; 454/166, 167, 195, 454/190, 192
See application file for complete search history.

(56) References Cited

U.S. PATENT DOCUMENTS

| | | | |
|---|---|---|---|
| 1,634,498 | A | 7/1927 | Hecox |
| 3,229,609 | A | 1/1966 | Larson et al. |
| 3,254,457 | A | 6/1966 | Gedney et al. |
| 3,294,006 | A | 12/1966 | Berner et al. |
| 3,324,783 | A | 6/1967 | Hickox |
| 3,362,469 | A | 1/1968 | Berner et al. |
| 3,683,578 | A | 8/1972 | Zimmerman |
| 3,886,851 | A | 6/1975 | Berner |
| 3,935,684 | A | 2/1976 | Frommelt et al. |

(Continued)

FOREIGN PATENT DOCUMENTS

| | | |
|---|---|---|
| EP | 2486336 A2 | 5/2012 |
| GB | 1432791 | 4/1976 |

OTHER PUBLICATIONS

Werle, H., Hydrodynamic Flow Visualization, 1973, pp. 361-383.

(Continued)

*Primary Examiner* — William Gilbert
(74) *Attorney, Agent, or Firm* — Standley Law Group LLP

(57) ABSTRACT

Enclosure assemblies for managing air flow. Such assemblies include an enclosure and at least one inclined pathway in contact with the enclosure, each pathway including a pair of side wall portions and a top wall portion that collectively extend between spaced apart openings to define an air mass. One opening having a lower boundary and the other opening having an upper boundary, with the lower boundary being at an elevation higher than that of the upper boundary, such that when a temperature differential exists within a given pathway, warmer air will be trapped in an upper portion of the air mass and above the upper boundary, thereby impeding air flow from the enclosure.

19 Claims, 5 Drawing Sheets

(56) References Cited

U.S. PATENT DOCUMENTS

| | | | |
|---|---|---|---|
| 4,003,170 A | 1/1977 | Mellyn | |
| 4,049,411 A | 9/1977 | Long et al. | |
| 4,062,157 A | 12/1977 | Potthoff | |
| 4,125,055 A | 11/1978 | Hesse et al. | |
| D256,164 S | 7/1980 | Phillips | |
| 4,228,729 A | 10/1980 | Messick | |
| 4,251,471 A | 2/1981 | Schwander et al. | |
| 4,282,689 A | 8/1981 | Royer | |
| 4,323,322 A | 4/1982 | O'Rourke et al. | |
| 4,365,452 A | 12/1982 | Fillman et al. | |
| 4,405,008 A | 9/1983 | Hazlett | |
| 4,453,383 A * | 6/1984 | Collins | 60/641.12 |
| 4,567,696 A | 2/1986 | Malet | |
| 4,574,543 A | 3/1986 | Crosson | |
| 4,608,785 A | 9/1986 | Rhodes et al. | |
| 4,637,176 A | 1/1987 | Acock, Jr. | |
| 4,638,612 A | 1/1987 | Bennett | |
| 4,848,386 A | 7/1989 | Cooper | |
| RE33,019 E | 8/1989 | Rhodes et al. | |
| 4,890,544 A | 1/1990 | Halton | |
| 5,109,643 A | 5/1992 | Speers | |
| 5,291,932 A | 3/1994 | Kraeutler | |
| 5,312,296 A | 5/1994 | Halton | |
| 5,319,882 A | 6/1994 | Biebuyck | |
| 5,394,662 A | 3/1995 | Giuliani et al. | |
| 5,601,131 A | 2/1997 | Morris | |
| 5,634,545 A * | 6/1997 | Plumley | 198/303 |
| 5,655,559 A | 7/1997 | Zembik et al. | |
| 5,675,945 A | 8/1997 | Giuliani et al. | |
| 5,799,680 A | 9/1998 | Dorflinger | |
| 5,878,803 A | 3/1999 | Kraeutler | |
| 5,909,777 A * | 6/1999 | Jamison | 169/43 |
| 5,927,025 A | 7/1999 | Brockman et al. | |
| 6,106,387 A | 8/2000 | Smith | |
| 6,145,572 A | 11/2000 | Kraeutler | |
| 6,170,204 B1 | 1/2001 | Stobel et al. | |
| 6,371,143 B1 | 4/2002 | Swetish | |
| 6,386,968 B2 * | 5/2002 | Mehlman | F24F 9/00 454/190 |
| 6,425,214 B1 | 7/2002 | Boffeli et al. | |
| 6,725,603 B1 | 4/2004 | Pansini | |
| 6,748,703 B1 | 6/2004 | Mandart | |
| 6,845,780 B2 | 1/2005 | Bishirjian | |
| 6,948,285 B2 | 9/2005 | Miller et al. | |
| 6,951,084 B2 | 10/2005 | Borgerding | |
| 6,957,679 B2 | 10/2005 | Powell et al. | |
| 7,052,390 B2 | 8/2006 | Otto et al. | |
| 7,185,463 B2 | 3/2007 | Borgerding | |
| 2010/0233951 A1 | 9/2010 | Biddle | |

OTHER PUBLICATIONS

Manning, P., Environmental Design as a Routine, Building and Environment, 1995, pp. 181-196, vol. 30, No. 2.
Wu, J. et al., Shear Layer Vortices and Longitudinal Vortices in the Near Wake of a Circular Cylinder, Experimental Thermal and Fluid Science, 1996, pp. 169-174.
Zhu, D. et al., Exchange Flow Through an Opening, Journal of Hydraulic Research, 2002, pp. 341-350, vol. 40, No. 3.
Tosteson, T. et al., Power and sample size calculations for generalized regression models with covariate measurement error, Statistics in Medicine, 2003, pp. 1069-1082.
Oral, G. et al., Building envelope design with the objective to ensure thermal, visual and acoustic comfort conditions, Building and Environment, 2004, pp. 281-287.
Phillips, J. et al., On ventilation of a heated room through a single doorway, Building and Environment, 2004, pp. 241-253.
Muhic, S. et al., The influence of indoor environment in office buildings on their occupants: expected-unexpected, Building and Environment, 2004, pp. 289-296.
Thatcher, T. et al., Pollutant dispersion in a large indoor space: Part 1—Scaled experiments using a water-filled model with occupants and furniture, Indoor Air, 2004, pp. 258-271.
Stathopoulos, T. et al., Outdoor human comfort in an urban climate, Building and Environment, 2004, pp. 297-305.
Bazelyan, E. et al., The effect of reduced air density on streamer-to-leader transition and on properties of long positive leader, Journal of Physics D: Applied Physics, 2007, pp. 4133-4144.
Mohammed, H. et al., Heat transfer measurements of mixed convection for upward and downward laminar flows inside a vertical circular cylinder, Experimental Heat Transfer, 2008, pp. 1-23.
Clarke, J. et al., The role of built environment energy efficiency in a sustainable UK energy economy, Energy Policy, 2008, pp. 4605-4609.
Perrin, R. et al., Coherent and turbulent process analysis in the flow past a circular cylinder at high Reynolds number, Journal of Fluids and Structures, 2008, pp. 1313-1325.
Shukuya, M., Exergy concept and its application to the built environment, Building Environment, 2009, pp. 1545-1550.
Liu, X., Evaluation on the impacts of the implementation of civil building energy efficiency standards on Chinese economic system and the environment, Energy and Buildings, 2009, pp. 1084-1090.
Jelle, B. et al., The path to the high performance thermal building insulation materials and solutions of tomorrow, Journal of Building Physics, 2010, pp. 99-123.
Chu, C. et al., A laboratory experiment of shear-induced natural ventilation, Energy and Buildings, 2011, pp. 2631-2637.
Chong, D. et al., An experimental study of pressure drop and friction factor for laminar and transition opposing mixed convection in entrance region of rectangular duct, Energy and Conversion Management, 2011, pp. 2272-2281.
Meggers, F. et al., Reduce CO2 from buildings with technology to zero emissions, Sustainable Cities and Society, 2012, pp. 29-36.
Nabi, S. et al., The hydraulics of exchange flow between adjacent confined building zones, Building and Environment, 2013, pp. 76-90.
Frank, D. et al., The effects of an opposing buoyancy force on the performance of an air curtain in the doorway of a building, Energy and Buildings, 2015, pp. 20-29.
Frank, D. et al., The effectiveness of an air curtain in the doorway of a ventilated building, J. Fluid Mech., 2014, pp. 130-164, vol. 756.
Lidwell, O., Air exchange through doorways. The effect of temperature difference, turbulence and ventilation flow, J. Hyg., 1977, pp. 141-154.
Valkeapaa, A. et al., Air Leakage Through Horizontal Air Curtains—an Experimental Study.
Stavrakakis, G. et al., Simulation of airflow in one- and two- room enclosures containing a fire source, International Journal of Heat and Mass Transfer, 2009, pp. 2690-2703.
Epstein, M., Buoyancy-Driven Exchange Flow Through Small Openings in Horizontal Partitions, Journal of Heat Transfer, 1998, pp. 885-893, vol. 110.
Socolow, R., The Coming Age of Conservation, Ann. Rev. Energy, 1977, pp. 239-289.
Hayes, F. et al., Design Data for air curtains, 1969, pp. 168-180, vol. 75, No. 2.
Lucchesi, C. et al., Doorway flow from reduced scale isothermal air/helium approach, International Journal of Thermal Sciences, 2011, pp. 1920-1929.
Stevenson, C. et al., Effects of topography on lofting gravity flows: Implications for the deposition of deep-water massive sands, Marine and Petroleum Geology, 2010, pp. 1366-1378.
Linden, P. et al., Emptying Filling Boxes: the fluid mechanics of natural ventilation, Journal of Fluid Mechanics, 1999, pp. 309-335, vol. 212.
Glicksman, L. et al., Energy Conservation in Chinese Residential Buildings: Progress and Opportunities in Design and Policy, Annu. Rev. Environ., 2001, pp. 83-115.
Brown, M. et al., Engineering- Economic Studies of Energy Technologies to Reduce Greenhouse Gas Emissions: Opportunities and Challenges, Annu. Rev. Energy Environ., 1998, pp. 287-385.
Byrne, G. et al., A single-headed fibre optic laser Doppler anemometer probe for the measurement of flow angles, Measurement Science and Technology, 2003, pp. 1-8.
Lane-Serff, G. et al., Gravity current flow over obstacles, J. Fluid Mech., 1995, pp. 39-53, vol. 292.

(56) References Cited

OTHER PUBLICATIONS

Simpson, J., Gravity currents in the laboratory, atmosphere, and ocean, Ann. Rev. Fluid Mech., 1982, pp. 213-234.

Moodie, T., Gravity currents, Journal of Computational and Applied Mathematics, 2002, pp. 49-83.

Heiselberg, P. et al., Experimental study of buoyancy driven natural ventilation through horizontal openings, Proceedings in Roomvent, 2007.

Johansson, D., The life cycle costs of indoor climate systems in dwellings and offices taking into account system choice, airflow rate, health and productivity, Building and Environment, 2009, pp. 368-376.

Lowe, R. et al., A laboratory study of the velocity structure in an intrusive gravity current, J. Fluid Mech.,2002, pp. 33-48, vol. 456.

Khalifa, A. et al., Natural convection in partitioned enclosures: experimental study on 14 different configurations, Energy and Conversion Management, 2001, pp. 653-661.

Lutzenhiser, L., Social and Behavioral Aspects of Energy Use, Annu. Rev. Energy Environ., 1993, pp. 247-289.

Linden, P.F. The Fluid Mechanics of Natural Ventilation, Annu. Rev. Fluid Mech., 1999, pp. 201-238.

Dalziel, S., The Hydraulics of Doorway Exchange Flows, Building and Environment, 1991, pp. 121-135, vol. 26, No. 2.

Armi. L., The hydraulics of two flowing layers with different densities, The Journal of Fluid Mechanics, 1986, pp. 27-58, vol. 163.

Rivera,J. et al., Turbulent heat and mass transfer through air curtains devices for the confinement of heat inside tunnels, International Communications in Heat and Mass Transfer, 2011, pp. 688-695.

Thomas, S., Knowledge is Power: Incandescent versus Fluorescent, 2003.

Blomqvist, C., Distribution of Ventilation Air and Heat by Buoyancy Forces Inside Buildings, Doctoral Thesis, 2009.

\* cited by examiner

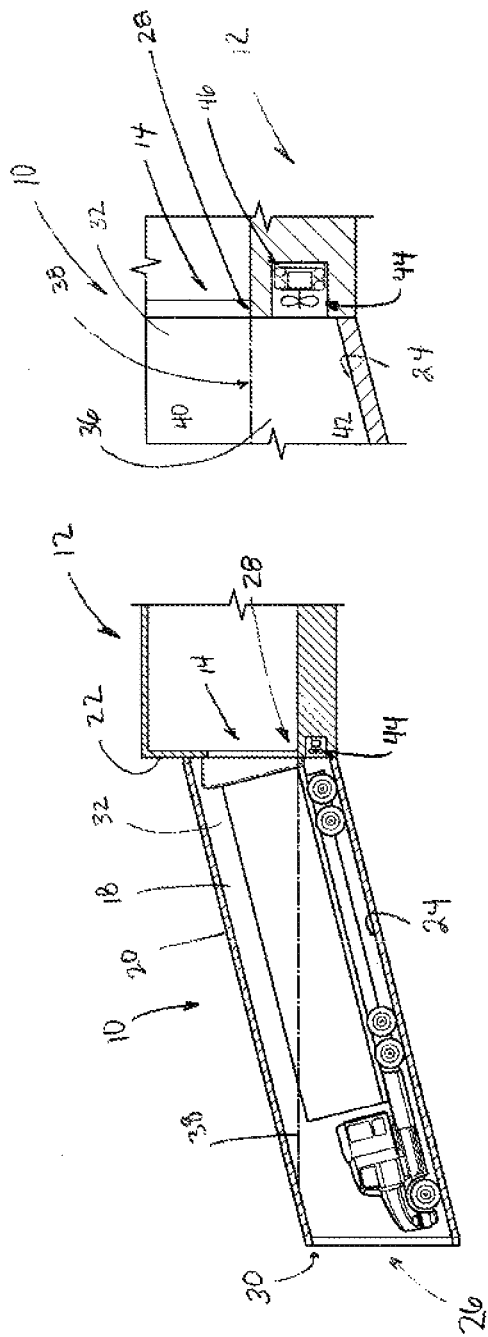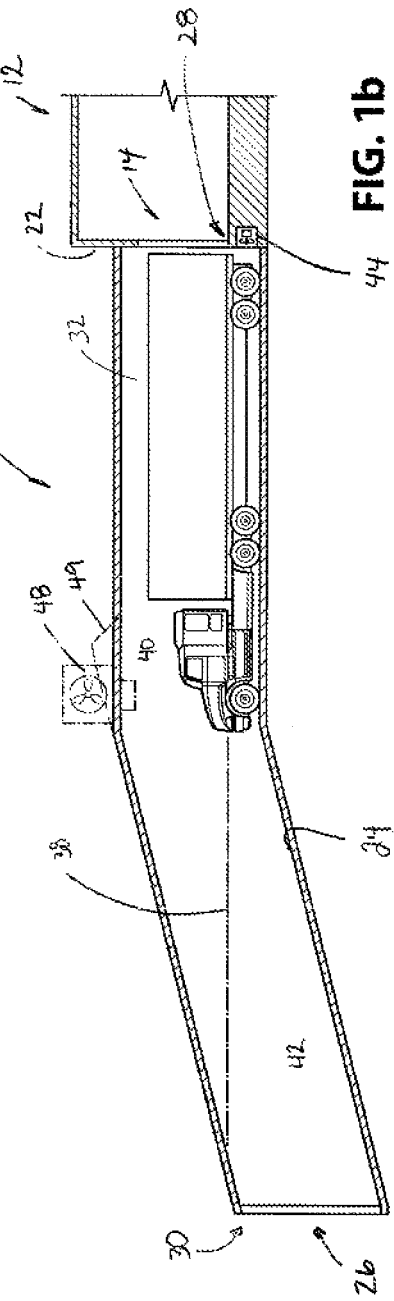

MANAGING AIR FLOW

CROSS-REFERENCE TO RELATED APPLICATIONS

This application is a continuation of U.S. application Ser. No. 12/695,061, filed on Jan. 27, 2010, which claims the benefit of U.S. Provisional Application No. 61/148,014, filed on Jan. 28, 2009.

FIELD OF THE INVENTION

The present invention relates to entranceways.

DESCRIPTION OF THE RELATED ART

Most warehouses, manufacturing facilities and large retail stores include loading docks that provide a location for loading and unloading vehicles. Further, some of these enclosures have various pedestrian entranceways to allow employees and customers to come and go. In northern climates, one area of concern is excessive heat loss in the winter months in loading docks and pedestrian entranceways. One means of addressing this concern is the control of air flow.

One common approach has been to employ an air curtain across a door. An air curtain is a forced flow of relatively high-velocity air across the opening of a door serving either to restrict the normal air exchange resulting from the temperature differential or to mix and dilute any air which does pass through the air curtain.

Another approach to controlling air flow is the installation of a physical barrier. One example is a strip door that is widely used to restrict the flow of air through an open warehouse door. Such a strip door employs transparent vinyl strips which enable personnel and vehicles to push through. The strips quickly fall back into place to act as the air flow barrier when the obstruction has cleared the door.

It would be desirable to provide an enhanced entranceway.

SUMMARY OF THE GENERAL INVENTIVE CONCEPT

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical, electrical or other configurations illustrated in the drawings are intended to exemplify embodiments of the invention. However, other alternative mechanical, electrical or other configurations are possible which are considered to be within the teachings of the instant disclosure. Furthermore, unless otherwise indicated, the term "or" is to be considered inclusive. The term "agent" is intended to include a portion of or any combination of hardware, firmware or software to carry out a prescribed function.

In one exemplary embodiment, there is provided a vehicle entranceway to an enclosure. The entranceway comprises a frame including a pair of laterally-spaced side wall portions and a top wall portion. The frame is adapted to be in contact with an exterior wall of the enclosure and in surrounding relation to a first opening therein. The side wall portions extend outwardly from the exterior wall on opposite sides of an inclined pathway. The inclined pathway and said side and top wall portions cooperate to define a second opening distally located to the exterior wall. The first opening has a lower boundary and the second opening has an upper boundary. The lower boundary is at an elevation higher than that of the upper boundary. Thus, in the presence of a temperature differential within the vehicle entranceway, warmer air is trapped in an upper portion of the vehicle entranceway and above the upper boundary.

An exemplary embodiment further comprises a blower to increase air flow across and/or along an air barrier layer within the enclosure. In this case, the blower may be provided with a heat source for conditioning the air barrier layer.

In an exemplary embodiment, there is provided a vehicle entranceway further comprising a heat source being associated with a blower for continuously circulating warm air within the vehicle entranceway. In one example the heat source originates from the inside of the enclosure.

In an exemplary embodiment, there is provided a vehicle entranceway further comprising at least one vent to egress fumes and/or to ingress fresh air. In this case, the at least one vent being located in the top wall portion.

In another exemplary embodiment, there is provided a method for managing air flow from a first opening of an enclosure comprising the steps of,
  providing a frame including a pair of laterally-spaced side wall portions and a top wall portion,
  providing the frame to be mounted in contact with an exterior wall of the enclosure and in surrounding relation to the first opening, the side wall portions to extend outwardly from the exterior wall,
  providing the side, top wall portions and a pathway to cooperate to define a second opening projecting from the exterior wall and to create a cavity within, and
  providing the first opening with a lower boundary and the second opening with an upper boundary wherein the upper boundary is at an elevation lower than a corresponding lower boundary on the first opening, wherein warmer air in the cavity is trapped in an upper portion of the cavity and above the upper boundary to impede air flow from the enclosure.

In another exemplary embodiment, there is provided an entranceway to an enclosure for managing air flow from at least one first opening of an enclosure comprising a frame being adapted to be in contact with an exterior wall of the enclosure and including a pair of laterally-spaced side wall portions, a top wall portion, an inclined pathway, and a second opening distally located to the exterior wall, the inclined pathway together with said side and top wall portions sealably cooperating to define an air mass, the first opening having a lower boundary and the second opening having an upper boundary, the lower boundary being at an elevation higher than that of the upper boundary wherein, when there is a temperature differential within the entranceway warmer air will be trapped in an upper portion of the air mass and above the upper boundary to impede air flow from the enclosure.

In yet another exemplary embodiment, there is provided a vehicle entranceway for managing air flow from a first opening of an enclosure comprising a frame including a pair of laterally-spaced side wall portions and a top wall portion, said frame being adapted to be mounted in contact with an exterior wall of the enclosure and in surrounding relation to the first opening, said side wall portions extending outwardly from the exterior wall, said side and top wall portions cooperating to define a second opening projecting from the exterior wall and to create a cavity within the vehicle entranceway, the first opening having a lower boundary and the second opening having an upper boundary wherein the lower boundary is at an elevation higher than that of the upper boundary, wherein when there is a temperature differential within the vehicle entranceway warmer air will be trapped in an upper portion of the cavity and above the upper boundary to impede air flow from the enclosure.

In another exemplary embodiment, there is provided a shelter apparatus for controlling air flow from a door opening of an enclosure comprising a frame including a pair of laterally-spaced side panels and a top panel, said frame being adapted to be mounted in contact with an exterior wall of the enclosure and in a surrounding relation to the door opening, said side panels extending outwardly from the exterior wall in relation with an inclined pathway to create a cavity, said side and top panels cooperating to define an air pocket within the cavity with a boundary region at an elevation between the door openings.

In another exemplary embodiment, there is provided an entranceway apparatus for controlling air flow from a door opening of an enclosure comprising a frame including a pair of laterally-spaced side panels and a top panel, said frame being adapted to be mounted in contact with an exterior wall of the enclosure and in surrounding relation to the door opening, an inclined pathway and said side panels extending outwardly from the exterior wall, said side and top panels cooperating to define an opening projecting from the exterior wall at an elevation operable to create an air barrier with a boundary region at an elevation between the door openings to impede the air flow through the entranceway.

In another exemplary embodiment, there is provided a vehicle entranceway structure for attachment to an enclosure, comprising a frame including a pair of laterally-spaced side wall portions and a top wall portion, said frame being adapted to be in contact with an exterior wall of the enclosure and in surrounding relation to a first opening therein, said side wall portions extending outwardly from the exterior wall, an inclined pathway and said side and top wall portions cooperating to define a second opening distally located to the exterior wall, the first opening having a lower boundary and the second opening having an upper boundary, the lower boundary being at an elevation higher than that of the upper boundary, the pathway having an upper surface, the side wall portions and top wall portions cooperating with the pathway to form a cavity with an operative boundary region capable of maintaining a mass of air therein at a temperature higher than ambient air external to the enclosure with the mass occupying a volume whose lower boundary lies below the lower boundary of the first opening and above the upper boundary of the second opening, with or without an auxiliary source of heated air being delivered to the cavity.

In an exemplary embodiment, the side wall and top wall portions include a first layer for establishing the operative boundary region and a second insulating layer for insulating the operative boundary region. In this case, the first and second layer including one or more substrates formed of plastic, wood, metal, glass, concrete or a combination thereof.

In an exemplary embodiment, the auxiliary heat source includes a duct in communication with the enclosure and/or a heat source within the enclosure to deliver heated air therefrom to the cavity.

In an exemplary embodiment, the side wall and top wall portions have an R value ranging from 0.1 to 70. In this case, the vehicle entrance way structure R value ranges from 1 to 45.

An exemplary embodiment further comprises an auxiliary source of heated air being delivered to the cavity. In this case, the auxiliary source of heated air being located at an intermediate region adjacent to the lower boundary. In another case, the auxiliary source of heat including a fan or blower for delivering a flow of air at an elevation between the upper and lower boundaries. In some cases, the auxiliary heat source including a duct in communication with the enclosure and/or a heat source within the enclosure to deliver heated air therefrom to the cavity.

BRIEF DESCRIPTION OF THE DRAWINGS

Several exemplary embodiments of the present invention will be provided, by way of examples only, with reference to the appended drawings, wherein:

FIGS. 1a and 1b are side cross sectional views of an entranceway with a vehicle;

FIG. 1c is a side cross sectional view of a portion of the entranceway and a blower;

DETAILED DESCRIPTION OF EXEMPLARY EMBODIMENTS

Figure 1:
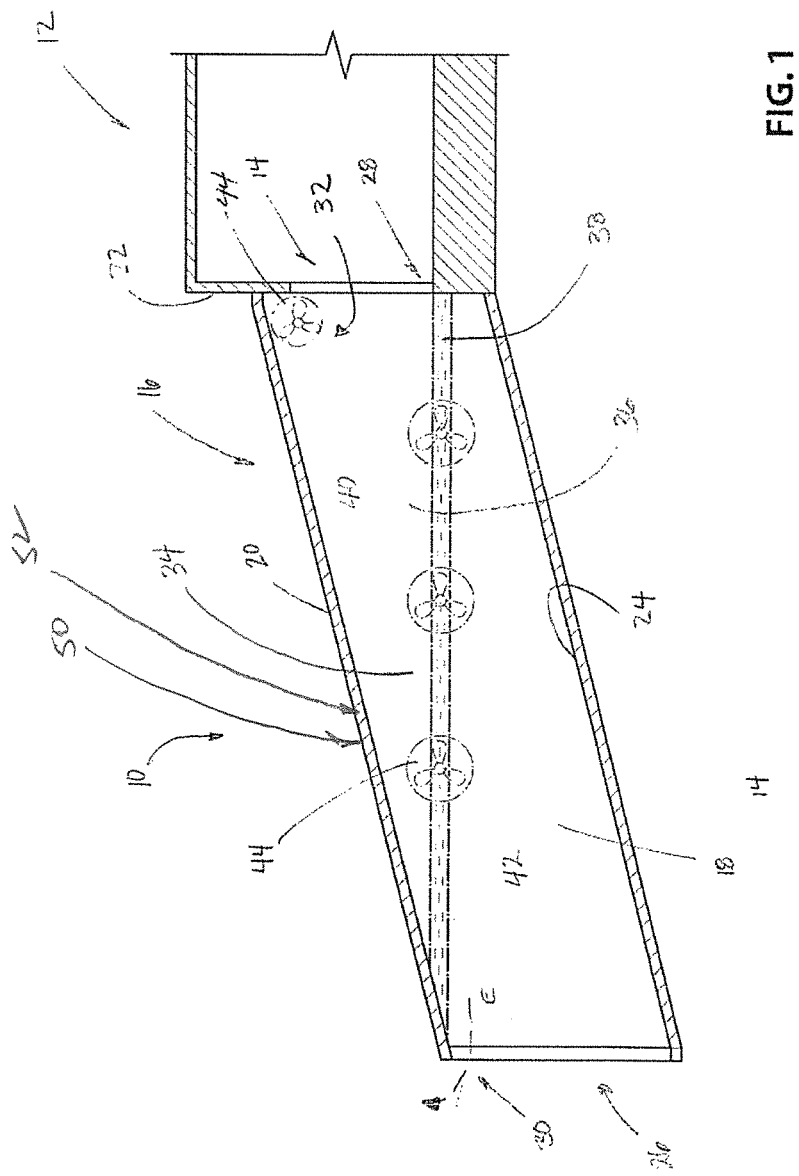
FIG. 1 is a side cross sectional view of an entranceway of enclosure.

Referring to the figures, there is provided an entranceway 10 to an enclosure 12 having a first opening 14. The entranceway has a frame 16 including a pair of laterally-spaced side wall portions 18 and a top wall portion 20. The frame 16 is adapted to be in contact with an exterior wall 22 of the enclosure 12 and in surrounding relation to the first opening 14. The side wall portions 18 extend outwardly from the exterior wall 22. As illustrated in FIGS. 1 and 1a, there is an inclined pathway 24 that, in cooperation with the side and top wall portions 18 and 20, defines a second opening 26 that is distally located to the exterior wall 22. The first opening 14 has a lower boundary 28 and the second opening 26 has an upper boundary 30. The lower boundary 28 is at an elevation higher than that of the upper boundary 30. As will be discussed, when there is a temperature differential within the entranceway 10, the warmer air will be trapped, or otherwise contained, in an upper portion 32 of the entranceway 10 and above the upper boundary 30.

Figure 2:
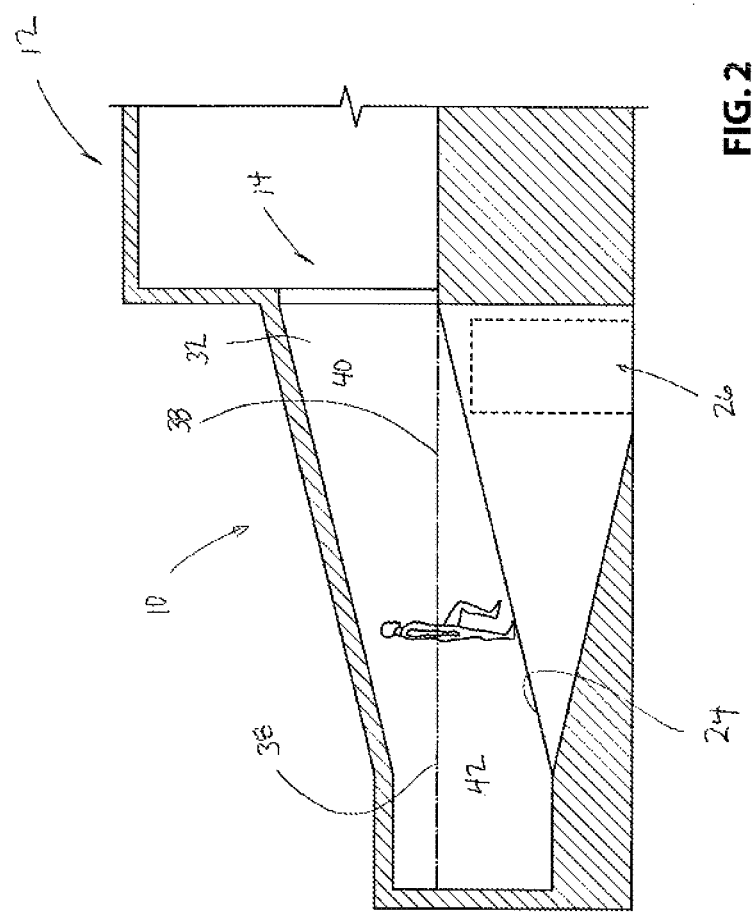
FIG. 2 is a side cross sectional view of the entranceway of the enclosure with a pedestrian.

As illustrated in FIG. 1b, the pathway 24 may have at least one portion which is inclined, that is by having a distal inclined portion adjacent the second opening 26 and a substantially horizontal (or non-inclined) portion adjacent the first opening 14. However, the converse may also be used in other cases as desired. FIG. 2 illustrates another example which employs two inclined portions joined by an individual horizontal portion.

The frame 16 may be constructed of steel or other suitable materials. The frame 16 may be a retrofit to an existing enclosure and may be sold as a kit (to be discussed later) or may be incorporated in the construction of a new enclosure. The side and top wall portions 18 and 20, in this example, may be provided with a level or grade (such as an R value) of insulation that provides adequate insulation. Generally, the greater the R value of insulation, the greater the ability of the enclosure to function in its role as a trap for warm air. In other words, the greater the control or reduction of heat dissipation, the greater the operating efficiency of the entrance way in its function to trap or contain warm air. This may be particularly the case where the entranceway is exposed to the relatively cold environments, such as during the winter months, presenting a large temperature differential between the trapped warm air inside the enclosure and the exterior ambient air. Thus, in one example, one or more of the side wall and top wall portions may have an R value ranging from 0.1 to 70. In another example, one or more of the side wall and top wall portions may have an R value ranging from 1 to 45. For example, as shown in FIG. 1, a first layer 50 for establishing an operating boundary layer and a second insulating layer 52 may be provided. The first and second layers 50 and 52, respectively may each be comprised of wood, glass, concrete or combinations thereof so as to provide protection from the elements and insulation.

Figure 1E:
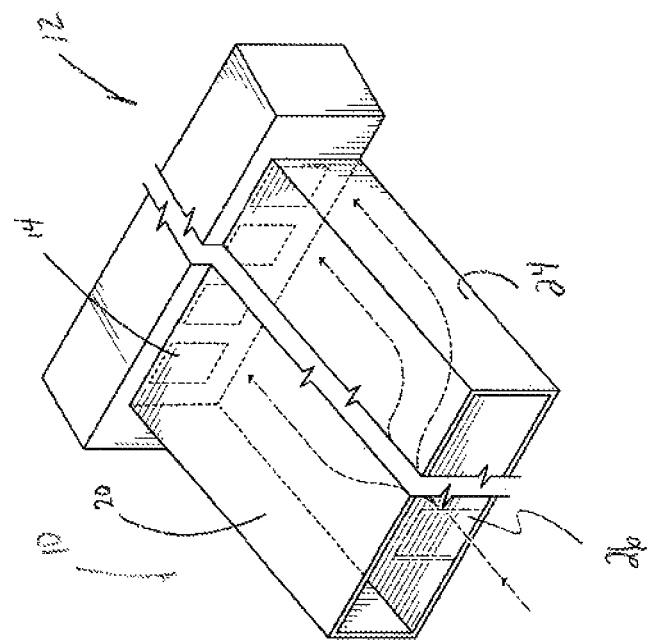
FIGS. 1d and 1e is a top perspective view of the entranceway of the enclosure.
Figure 1D:
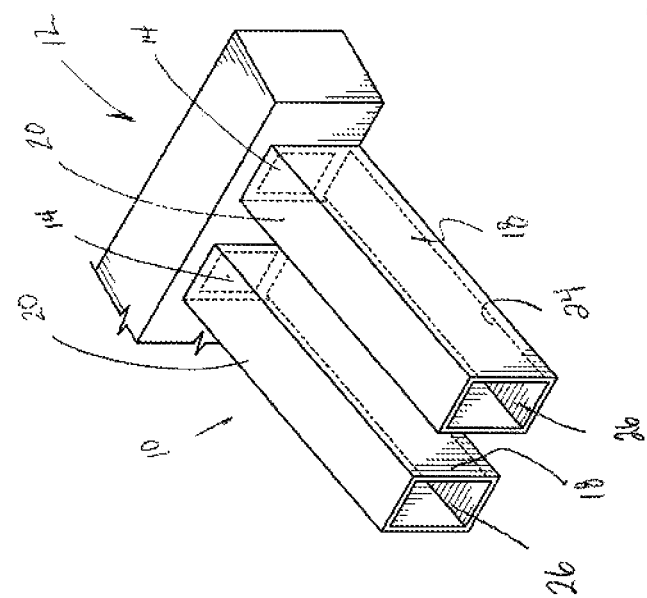

As shown in FIG. 1d, each entranceway has a single opening in the enclosure. However, as illustrated in FIG. 1e, the enclosure may have several first openings 14 (for example to provide access to neighbouring loading docks). Further, the second opening 26 may be of a reduced width relative to the laterally-spaced side wall portions.

The inclined pathway 24 and the side and top wall portions 18 and 20 cooperate to form a cavity 34 within the entranceway 10 to define an air mass 36 therein.

In this case, the top wall portion 20 may be formed with a flat, domed, A-framed or other configuration, provided that it provides, with the side wall portions, the cavity 34 in a form to effectively receive and contain the air mass 36. As illustrated in FIG. 1 at 38, an air barrier layer may be created between a relatively warmer air region 40 and a relatively cooler air region 42. In this case, the inclined pathway 24 may include a prepared or unprepared ground surface, a layer of concrete and/or other building materials, and may also be formed to provide a level of insulation in order to moderate the relatively cooler air region 42, thus lowering the temperature differential between the relatively warmer air region 40 and the relatively cooler air region 42. While not intending to be bound to any one particular operating configuration, the enclosure in one example, may be considered to be working effectively with a relatively warmer air region 40 when being maintained at a temperature ranging from 29.8 to 42.0 degree Celsius when the relatively cooler air region 42 has a temperature ranging from 21.6 to 28.2 degree Celsius, with the exterior ambient air outside the enclosure at a temperature ranging from 16.8 to 17.1 degree Celsius. As with any gas, air contains molecules that move or agitate. This movement or agitation becomes greater as the temperature rises and the molecules occupy more space. This causes the mass of the air to expand. Although the total mass of the air has not changed, it occupies a greater volume, so any given cubic area will be lighter. Thus the air barrier layer 38, in dead calm conditions, may be generally horizontal. However, the air barrier layer 38 may bend or fluctuate away from the static horizontal position shown.

It should be borne in mind that the air barrier layer, in this case, may only be identifiable by a relatively sharp temperature transition between the warmer and cooler air regions 40 and 42, such as a temperature transition of 10 to 20 degrees Celsius over the distance of about 6 to about 18 inches, for instance. As illustrated in FIG. 1, the air barrier layer 38 may not occupy a discrete region but may represent instead a transition zone between the relatively warmer air region 40 and the relatively cooler air region 42.

Figure 3:
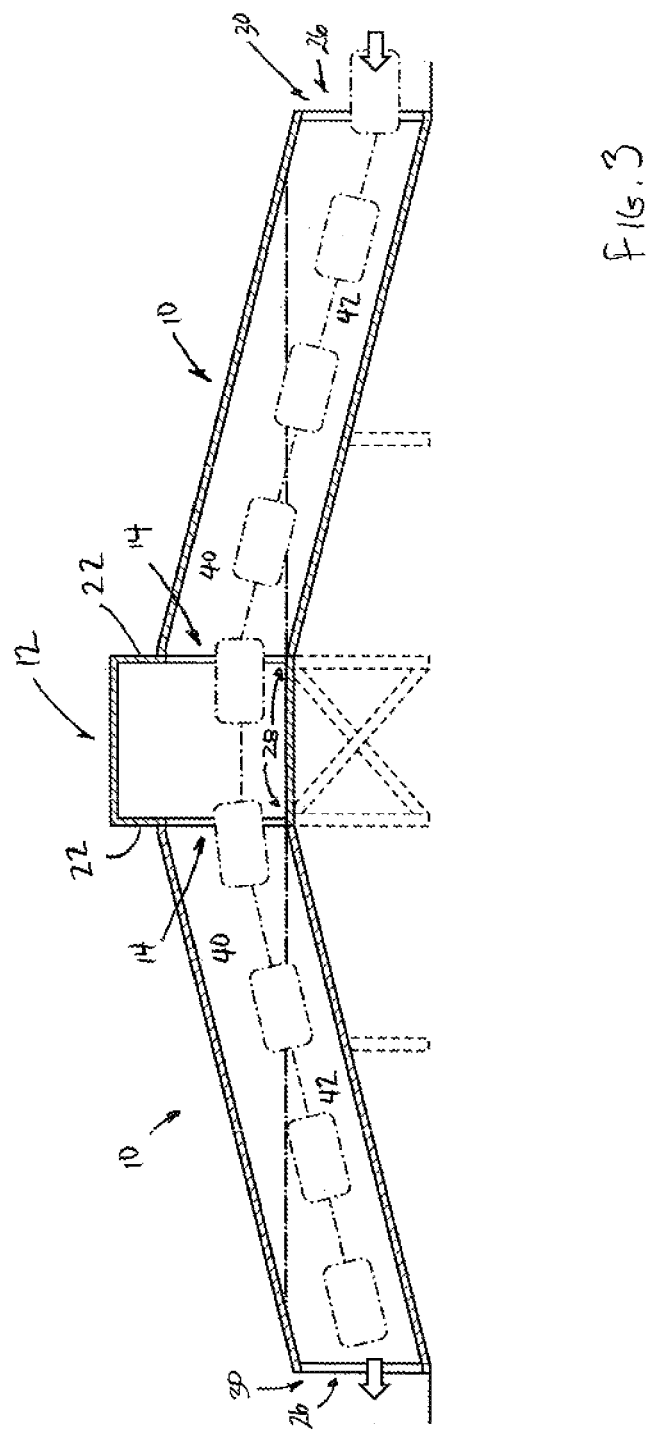
FIG. 3 is a side cross sectional view of the two entranceways of an enclosure.

Now referring to FIGS. 1, 1a and 1b, the pathway 24 may be used for vehicular, pedestrian and/or wheelchair use. Other uses have been contemplated, for example in manufacturing wherein the pathway may be a conveyor or an assembly line, as shown in FIG. 3. For example, the pathway may travel through a heated enclosure having a first entranceway leading into the enclosure and a second entranceway leading out. The heated air mass is trapped within the cavity created by the side and top wall portions of each entranceway.

Now referring to FIG. 1c, the enclosure may be provided with one or more blowers, one of which is shown at 44 to increase air flow across or along the air barrier layer 38. In this example, the blower 44 is associated with the enclosure 12 just under the lower boundary 28 of the first opening 14. In another configuration, as shown in FIG. 1, the blower 44 (in this case in a group of blowers) may be perpendicular to the pathway 24 and thus blowing in a sideways direction rather than lengthwise as is the case with the blower 44 in FIG. 1c. In yet another example, the blower may work in conjunction with, or be replaced by, a heat source for conditioning the air mass. In the example of FIG. 1c, the heat source 46 is provided in the form of a number of heat ducts 46, and is associated with blower 44 for continuously circulating warm air 40 within the entranceway 10 to enhance the air barrier layer 38. The heat source 46 may be, for example, a natural gas heater, or other fossil fuel or electric heater, and is associated with the entranceway. Alternatively, the heat source may be provided in the form of a duct in communication with an interior space of the enclosure or another heat source inside the enclosure for drawing warm air from the enclosure to the warmer air region. Another example for providing a heat source 46 for the entranceway 10 may be to heat the pathway 24 or a portion of the pathway 24, by way of radiant heating circuits, such as by electrical or circulating heating fluid for instance.

As illustrated in FIG. 1b, there may be provided at least one venting unit 48 to remove fumes from inside the cavity 34 and/or to draw in fresh air thereto. In this example, the venting unit 48 is located in the top wall portion 20. There may also be a venting unit for use in the summer months to regulate the temperature differential within the entranceway. Further, there may be an additional trap with a vent for fumes as illustrated in FIG. 1b at 49.

There may also be provided, a kit or combination of parts for retrofitting an entranceway to an enclosure. The kit or combination of parts may include a frame comprising a pair of laterally-spaced side wall portions and a top wall portion. The kit may also include fasteners for assembly of the frame and/or attachment of the frame to an exterior wall of the enclosure in a surrounding relation to the first opening. The side wall portions are assembled in an outwardly extending fashion from the exterior wall. In this case, the walls may either cover an existing inclined pathway or a pathway may be constructed so that the upper boundary 30 of the second opening is below the lower boundary 28 of the first opening 14. The kit may further include one or more heat sources, fans and/or vents or the like.

The entranceway manages air flow by providing a cavity created by a pair of laterally-spaced side wall portions and a top wall portion. The side wall portions extend outwardly from the exterior wall and, with the top wall portions, cooperate to define a second opening projecting from the exterior wall. The second opening is arranged so that its upper boundary is at a lower elevation than the corresponding lower boundary of the first opening. In the presence of a temperature differential within the entranceway, relatively warmer air is trapped in an upper portion of the cavity and above the upper boundary. When relatively warmer air is found within the cavity and above the upper boundary and at a temperature which is equal to or greater than the air inside the enclosure, air flow from the enclosure to the cavity through the first opening should generally be impeded, or at least reduced, while allowing the first and second openings to indeed remain open. In this instance, the relatively warmer air may itself have a temperature differential between the air barrier layer and the inside surface of the wall and roof portions. The entranceway is believed to provide maximum benefit when the temperature of the relatively warmer air in the warmer air region 40 is equal to or greater than the air inside the enclosure, as aided, in one example, by the use of blowers or heating ducts. Meanwhile, there may also be beneficial effects when the temperature of the relatively warmer air is below the temperature of the air inside the enclosure. The blowers may provide the benefit of reducing the temperature differential by constantly mixing the relatively warmer air while the heat source may thus function to add heated air to overcome air leakage or heat loss as the case may be. The speed or interval of operation of the blowers and the heat sources may also be adjusted according to the changing temperatures of the exterior ambient air, wind conditions of the exterior ambient air, and the temperatures of the relatively warmer air region and the relatively cooler air region, that is on either side of the transition zone.

Another benefit of the entrance way may lie in the fact that the transition zone is above the upper boundary of the second opening and below the lower boundary of the first opening, thereby reducing air flow at both the first and second openings. This may be especially relevant at the second opening if the blowers and/or heat sources are configured to provide only sufficient air movement and heat to maintain a relatively stable and even temperature throughout the relatively warmer air region while reducing the growth of the mass of the relatively warmer air region so that it does not migrate downwardly and induce an alternate escape route for the relatively warmer air at the second opening as shown by the dashed arrow E in FIG. 1.

Further features of exemplary entranceway embodiments according to the invention may be found in the reference materials submitted as "Appendix to the Specification".

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An enclosure assembly for managing air flow, comprising:

an enclosure forming a cavity and accessible by at least one first opening;

at least one inclined pathway in contact with the enclosure and accessible to the at least one first opening, the inclined pathway bordered by a pair of laterally-spaced side wall portions and a top wall portion, the side and top wall portions extending downwardly from the first opening to at least one second opening, the inclined pathway together with said side and top wall portions sealably cooperating with the enclosure to contain an air mass therein, the first opening having a lower boundary and the second opening having an upper boundary, with the lower boundary of the first opening being at an elevation higher than that of the upper boundary of the second opening; and a conditioned air flow source configured to form an air flow across and/or along an air barrier layer at or above the inclined pathway and extending between the side wall portions below the lower boundary and above the upper boundary;

wherein, when there is a temperature differential above the inclined pathway, warmer air will be trapped above the air barrier layer, thereby impeding migration of warm air from the enclosure through the air barrier layer and through the second opening.

2. The enclosure assembly of claim 1, wherein the at least one inclined pathway includes an assembly line.

3. The enclosure assembly of claim 1, wherein the conditioned air flow source includes at least one blower.

4. The enclosure assembly of claim 3, wherein the at least one blower is substantially horizontally aligned with the lower boundary of the first opening.

5. The enclosure assembly of claim 3, wherein the at least one blower includes a plurality of blowers, which are operable to deliver the air flow to the air barrier layer in a substantially horizontal direction.

6. The enclosure assembly of claim 3, wherein the at least one blower is operable in conjunction with a heat source and/or a number of heat ducts.

7. The enclosure assembly of claim 1, wherein the conditioned air flow source includes a number of ducts for delivering the air flow to the air barrier layer.

8. The enclosure assembly of claim 7, wherein one of the ducts is in communication with an interior space of the enclosure for drawing warm air therefrom.

9. The enclosure assembly of claim 1, wherein the conditioned air source includes a heat source.

10. The enclosure assembly of claim 1, wherein the at least one first opening includes a plurality of first openings, each with a corresponding inclined pathway.

11. An enclosure assembly for managing air flow, comprising:

an enclosure forming a cavity to contain an air mass and including a first opening and a second opening opposite the first opening;

a first inclined pathway, in contact with the enclosure at the first opening and extending downwardly from the first opening to a third opening;

a second inclined pathway, in contact with the enclosure at the second opening and extending downwardly from the second opening to a fourth opening;

each inclined pathway bordered by a pair of laterally-spaced side wall portions, and a top wall portion;

each of the inclined pathways together with the corresponding side and top wall portions sealably cooperating to define respective first and second air masses; and each of the first and second openings having a lower boundary and the corresponding third and fourth openings having an upper boundary, the lower boundary of each of the first and second openings being at an elevation higher than that of the upper boundary of each of the corresponding third and fourth openings; and at least one conditioned air flow source configured to form an air flow across and/or along an air barrier layer at or above each inclined pathway and extending between the first and third openings and between the second and fourth openings, respectively;

wherein, when there is a temperature differential above a given pathway, warmer air will be trapped above the air barrier layer, thereby impeding migration of warmer air flow from the enclosure through the air barrier layer and through the corresponding third or fourth opening.

12. The enclosure assembly of claim 11, further comprising a conveyor extending upwardly from the fourth opening and along the second pathway, the conveyor entering the second opening, through the enclosure, and exiting the first opening and extending downwardly along the first pathway to the third opening.

13. The enclosure assembly of claim 11, wherein the conditioned air flow source includes at least one blower.

14. The enclosure assembly of claim 13, wherein the at least one blower includes a plurality of blowers, each substantially horizontally aligned with the lower boundary of the corresponding first and/or second opening.

15. The enclosure assembly of claim 13, wherein the at least one blower includes a plurality of blowers which are operable to deliver the air flow to the air barrier layer in a substantially horizontal direction.

16. The enclosure assembly of claim 13, wherein the at least one blower is operable in conjunction with a heat source and/or a number of heat ducts.

17. The enclosure assembly of claim 11, wherein the conditioned air flow source includes a number of ducts for delivering the air flow to the air barrier layer of each inclined pathway.

18. The enclosure assembly of claim 17, wherein one of the ducts is in communication with an interior space of the enclosure for drawing warm air therefrom.

19. The enclosure assembly of claim 11, wherein the conditioned air flow source includes a heat source.

* * * * *